(12) United States Patent
Lu et al.

(10) Patent No.: US 8,253,385 B2
(45) Date of Patent: Aug. 28, 2012

(54) POWER SUPPLY

(75) Inventors: Yuan-Jui Lu, Hsichih (TW); Kai-Shen Chen, Hsichih (TW)

(73) Assignee: SolarFocusTechnology Co., Ltd., Taipei County (TW)

( * ) Notice: Subject to any disclaimer, the term of this patent is extended or adjusted under 35 U.S.C. 154(b) by 418 days.

(21) Appl. No.: 12/647,150

(22) Filed: Dec. 24, 2009

(65) Prior Publication Data

US 2010/0244774 A1    Sep. 30, 2010

(30) Foreign Application Priority Data

Mar. 30, 2009    (TW) .............................. 98110359 A

(51) Int. Cl.
*H02J 7/00* (2006.01)

(52) U.S. Cl. ........................................ 320/138; 320/107

(58) Field of Classification Search .................... 320/138
See application file for complete search history.

(56) References Cited

U.S. PATENT DOCUMENTS

| 4,922,178 A | 5/1990 | Matuszewski et al. |
| 5,844,325 A | 12/1998 | Waugh et al. |
| 6,384,570 B2 | 5/2002 | Matsuyama |
| 2005/0189921 A1* | 9/2005 | Bayne et al. ................... 320/138 |
| 2005/0189925 A1* | 9/2005 | Nagai et al. ................... 320/148 |
| 2006/0103355 A1* | 5/2006 | Patino et al. ................... 320/138 |

FOREIGN PATENT DOCUMENTS

| CN | 2760837 Y | 12/2004 |
| CN | 201075722 Y | 4/2007 |
| EP | 1837734 | 3/2009 |
| JP | 2005323483 | 11/2005 |
| TW | 543994 | 12/2001 |

* cited by examiner

*Primary Examiner* — Arun Williams
(74) *Attorney, Agent, or Firm* — Ming Chow; Sinorica, LLC

(57) ABSTRACT

This invention discloses a power supply and a dual-chargeable battery pack therein, wherein the dual-chargeable battery pack comprises a main body provided with an electrical energy storage device, a first connecting device and a second connecting device. The first connecting device comprises a first charging terminal set and a first power output terminal set, wherein the first charging terminal set is configured to receive an input of a first power for outputting to the electrical energy storage device. The second connecting device comprises a second charging terminal set which is configured to receive an input of a second power for outputting to the electrical energy storage device. The electrical energy storage device is configured to output the electrical energy accumulated therein as a third power through the first power output terminal set. The second power is different than the first power.

12 Claims, 7 Drawing Sheets

POWER SUPPLY

BACKGROUND OF THE INVENTION

1. Technical Field

The present invention relates to a power supply and a battery pack therein. More particularly, the present invention relates to a power supply and a battery pack having charging capabilities.

2. Description of Related Art

To various modern portable electronic products, such as MP3s, PDAs, notebook computers, electronic pocket translators, digital cameras, and so on, batteries are indispensable. Among a variety of batteries, secondary batteries, in virtue of the recharge ability, have been recognized as economically beneficial and environmentally friendly, thus being increasingly applied in a wide range of applications.

Generally, charging a secondary battery has to be performed by means of a battery charger that implements a transformer to convert the grid power supply into a charging power source having a predetermined voltage level, for charging the secondary battery. However, this approach has its inherent defect because it is difficult to access a charging power source conveniently outdoors. This defect significantly weakens the efficiency of the battery charger and in turn the power provision depends thereon, thereby inconveniencing the users.

On the other hand, with the drain of non-renewable resources, electricity has become increasingly short and costly. This drives the development of exploitation and applications of the inexhaustible green energy source. Furthermore, it is desired that those portable digital devices such as MP3s, PDAs, iPods and iPhones can be resupplied with power on the go. Hence, how to ensure power provision to the portable electronic products through simple portable batteries (e.g. one for a notebook computer), without limitations, even at places without the grid power supply, would be an issue to be addressed.

BRIEF SUMMARY OF THE INVENTION

In view of the shortcomings of the prior art, the present invention provides a power supply and a dual-chargeable battery pack therein. The dual-chargeable battery pack primarily comprises a main body including an electrical energy storage device, a first connecting device and a second connecting device. The first connecting device comprises a first charging terminal set and a first power output terminal set. The first charging terminal set is configured to receive an input of a first power for outputting to the electrical energy storage device. The second connecting device comprises a second charging terminal set which is configured to receive an input of a second power for outputting to the electrical energy storage device. The electrical energy storage device is configured to output the electrical energy accumulated therein as a third power through the first power output terminal set. The second power is different from the first power.

Therefore, it is a primary objective of the present invention to provide a power supply and a dual-chargeable battery pack therein, wherein the dual-chargeable battery pack has a first connecting device configured to receive an input of a first power and a second connecting device configured to receive an input of a second power, enabling the dual-chargeable battery pack to receive two different kinds of power inputs for charging and saving power in the electrical energy storage device, so that the dual-chargeable battery pack is efficient in charging.

It is a secondary objective of the present invention to provide a power supply and a dual-chargeable battery pack therein, wherein the dual-chargeable battery pack has a first connecting device configured to receive an input of a first power and a second connecting device configured to receive an input of a second power, while the dual-chargeable battery pack employs an input modulation device to modulate two different kinds of power inputs before outputting them into the electrical energy storage device, so that the electrical energy storage device is effectively secured from having the accumulated electrical potential oversaturated due to its loading the two different kinds of power inputs.

It is still another objective of the present invention to provide a power supply and a dual-chargeable battery pack therein, wherein the dual-chargeable battery pack has a first connecting device configured to receive an input of a first power and a second connecting device configured to receive an input of a second power, while the dual-chargeable battery pack employs an input modulation device to modulate two different kinds of power inputs before outputting them into the electrical energy storage device, in which the input modulation device further has a reverse-current prevention portion, so that when the electrical energy storage device has its accumulated electrical potential higher than the electrical potential of the first power or the second power, the accumulated electrical potential energy in the electrical energy storage device can be effectively prevented from flowing reversely.

It is yet another objective of the present invention to provide a power supply, wherein a dual-chargeable battery pack contained therein is configured to receive an input of a first power and an input of a second power, and by modulating the inputs from the first power and the second power, a third power can be output and supplied to a portable device.

BRIEF DESCRIPTION OF THE SEVERAL VIEWS OF THE DRAWINGS

The invention as well as a preferred mode of use and advantages thereof will be best understood by referring to the following detailed description of the illustrative embodiments in conjunction with the accompanying drawings, wherein.

DETAILED DESCRIPTION OF THE INVENTION

While the present invention discloses a power supply and a chargeable battery pack therein, the principles of battery charge/discharge implemented therein have been appreciated by people skilled in the art, and will not be discussed in detail in this description. Meantime, the accompanying drawings are for the purpose of schematically expressing structural features of the present invention and not made to scale.

Figure 1A:
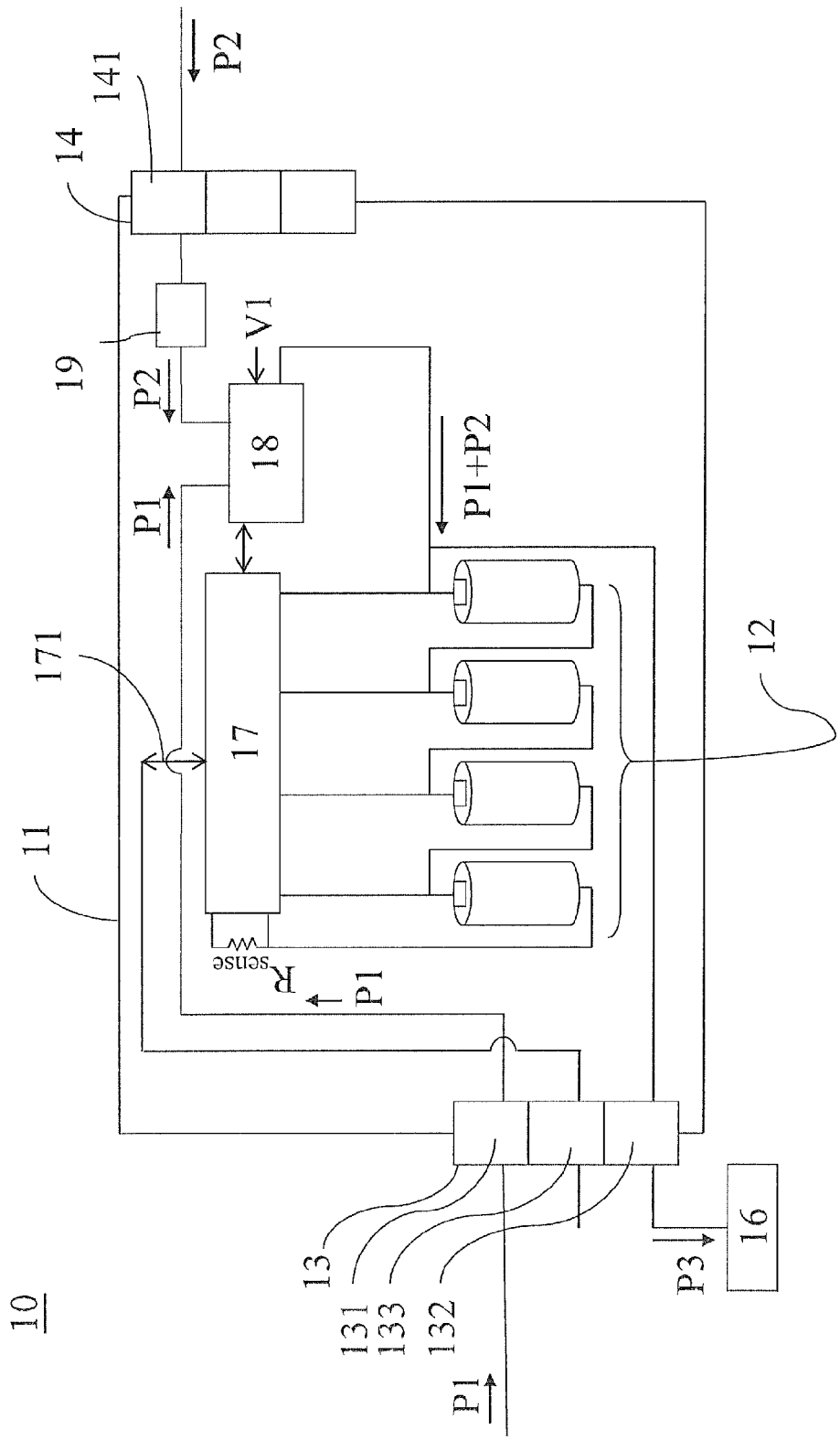
FIG. 1A is a circuit block diagram of a dual-chargeable battery pack according to a first preferred embodiment of the present invention.

Referring to FIG. 1A for a dual-chargeable battery pack 10, according to a first preferred embodiment of the present invention, the dual-chargeable battery pack 10 primarily has a main body 11, which includes an electrical energy storage device 12, a first connecting device 13 and a second connecting device 14. The first connecting device 13 and the second connecting device 14 are settled on the main body 11 and exposed from the main body 11. The first connecting device 13 has at least a first charging terminal set 131, a first power output terminal set 132 and a first signaling terminal set 133. The first charging terminal set 131 is configured to receive an input of a first power P1 and outputs the first power P1 to the electrical energy storage device 12. In the present embodiment, the electrical energy storage device 12 is realized by four battery cells connected in series for storing electrical energy. In practical use, the number and the connecting manner of the battery cells may be varied as needed. More particularly, the electrical energy storage device 12 may be constructed from 1, 2, 3, 4 or more than 4 battery cells that are of a series connection, a parallel connection or a series-parallel connection. The second connecting device 14 has a second charging terminal set 141, which is configured to receive an input of a second power P2 and outputs the second power P2 to the electrical energy storage device 12. Thereby, the electrical energy storage device 12 can accumulate the electricity from the first power P1 and the second power P2, and then outputs the accumulated electrical energy from the first power P1 and the second power P2 as a third power P3 through the first power output terminal set 132. The first power P1 and the second power P2 are different from each other. By receiving the two different inputs of power, the dual-chargeable battery pack 10 is efficient in charging.

Furthermore, the second power P2 may be a green power source, or may come from a light conversion battery. Alternatively, the second power P2 may be generated by a fuel cell, a wind power generator, a swinging-based power generator, or a vibration-based power generator. Consequently, when a user is at a place where there is no grid power source available to be converted by a transformer into a charging power source having a predetermined voltage level, the second power P2 can act as a power source for external electronic products. When the first power output terminal set 132 outputs the electrical energy accumulated in the electrical energy storage device 12 as a third power P3, the third power P3 can be directly supplied to the portable device 16, wherein the portable device 16 may be a digital or an analog electronic products, such as a notebook computer, a netbook computer, a mobile phone, a digital camera, a video camera, a hand-held videogame, a Walkman, a PDA or a GPS navigator, or even a power supply, without limitation. Through the first power output terminal set 132 of the main body 11, the output third power P3 can thus power the portable device 16.

Figure 1B:
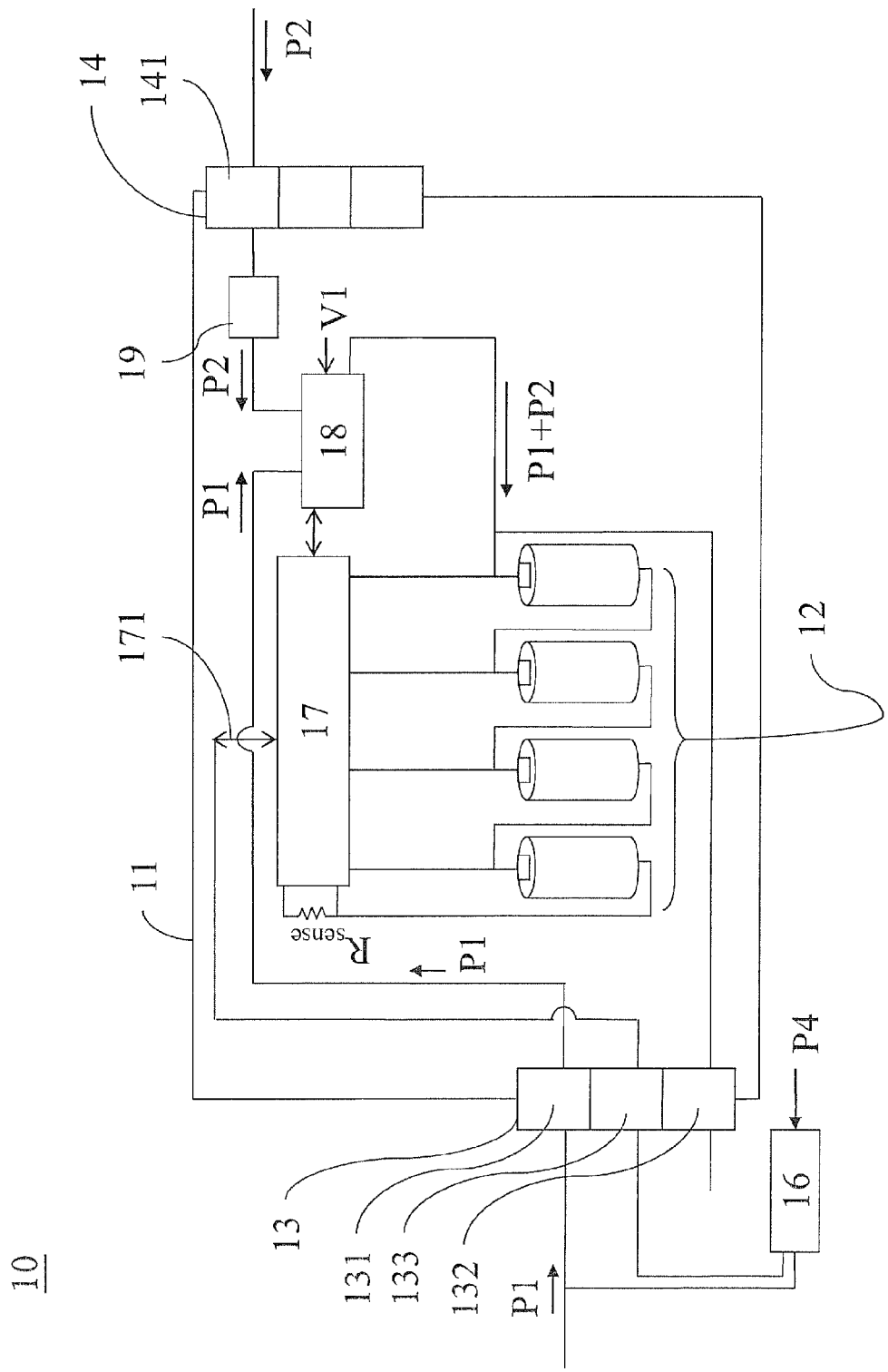
FIG. 1B is a circuit block diagram of a dual-chargeable battery pack according to a first preferred embodiment of the present invention.

Referring to FIG. 1B, in the foregoing embodiment, when the portable device 16 is a power supply, by connecting the portable device 16 to the first charging terminal set 131 of the first connecting device 13 on the main body 11, a fourth power P4 provided by the portable device 16 can be directly input to the main body 11 for acting as the first power P1 required by the main body 11. Furthermore, the first power P1 can be output to the electrical energy storage device 12 through the first charging terminal set 131 of the main body 11. In addition, a first control unit 17 (also known as a battery control unit) is provided inside the main body 11 for signal or data transmission between the first control unit 17 and the portable device 16 by means of a bidirectional bus 171 and the first signaling terminal set 133 of the first connecting device 13 connected therewith. Furthermore, the first control unit 17 may also use a battery balance unit to achieve power balancing among the four cells in the electrical energy storage device 12. Furthermore, a sense resistor $R_{sense}$ is connected in parallel with the first control unit 17 for detecting charge/discharge of the cells inside the electrical energy storage device 12.

Figure 1C:
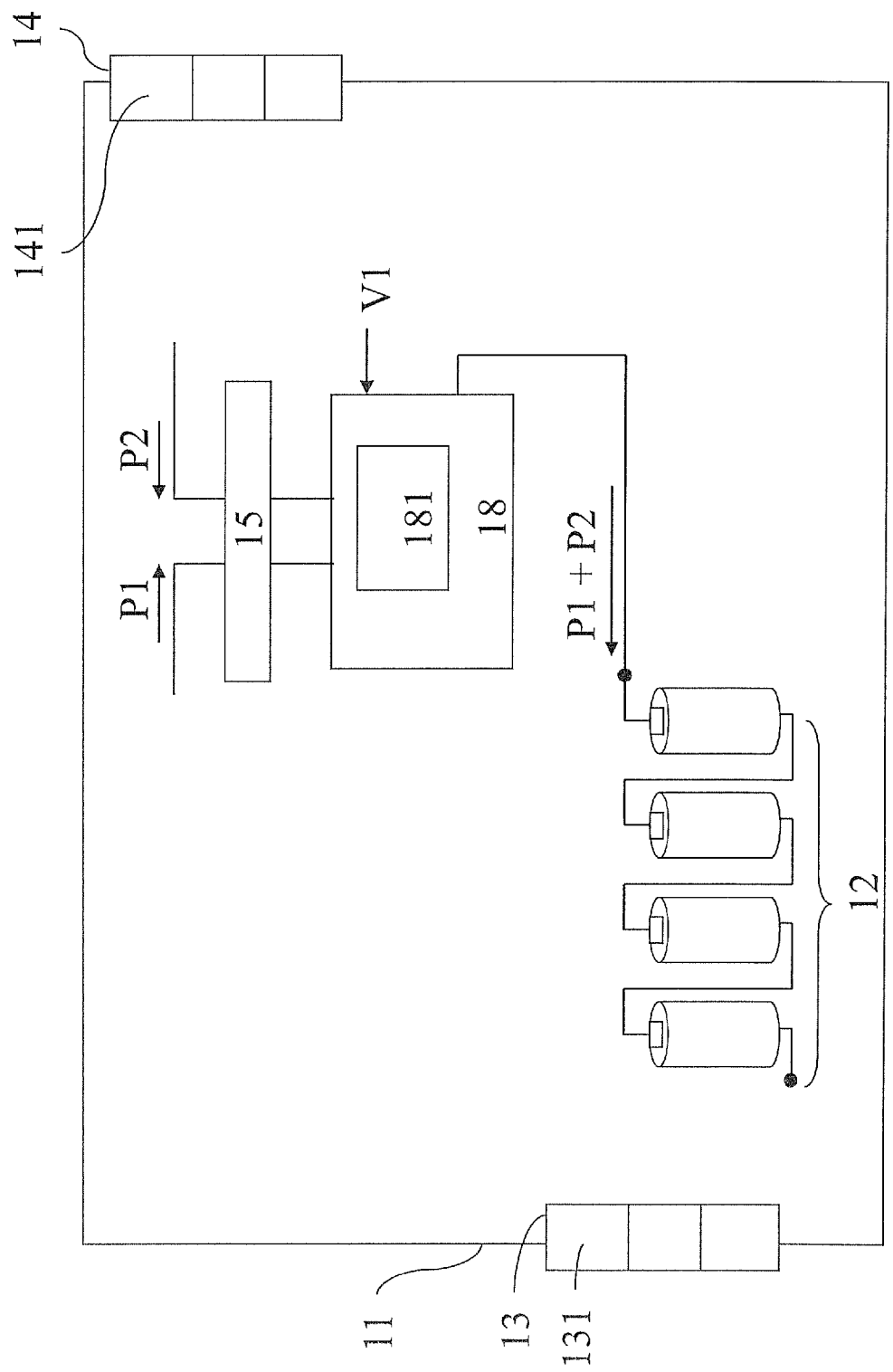
FIG. 1C is a circuit block diagram of a main body of a dual-chargeable battery pack according to a first preferred embodiment of the present invention.

In the foregoing embodiment, both of the first power P1 and second power P2 may be DC power or AC power, or either one of the first power P1 and second power P2 is a DC power and an AC power, respectively. Referring to FIG. 1C, the dual-chargeable battery pack 10 may further has at least one AC-DC power conversion device 15, so that when either or both of the first power P1 and the second power P2 are AC power, the AC-DC power conversion device 15 serves to concert the AC power into DC power acceptable to the electrical energy storage device 12. Furthermore, an input modulation device 18 is further provided inside the main body 11 for modulating the first power P1 and the second power P2 output to the electrical energy storage device 12 so that the first power P1 and the second power P2 can be stably received by the electrical energy storage device 12, thereby effectively securing the electrical energy storage device 12 from having the accumulated electrical potential oversaturated due to its loading the two different kinds of power inputs.

Figure 1D:
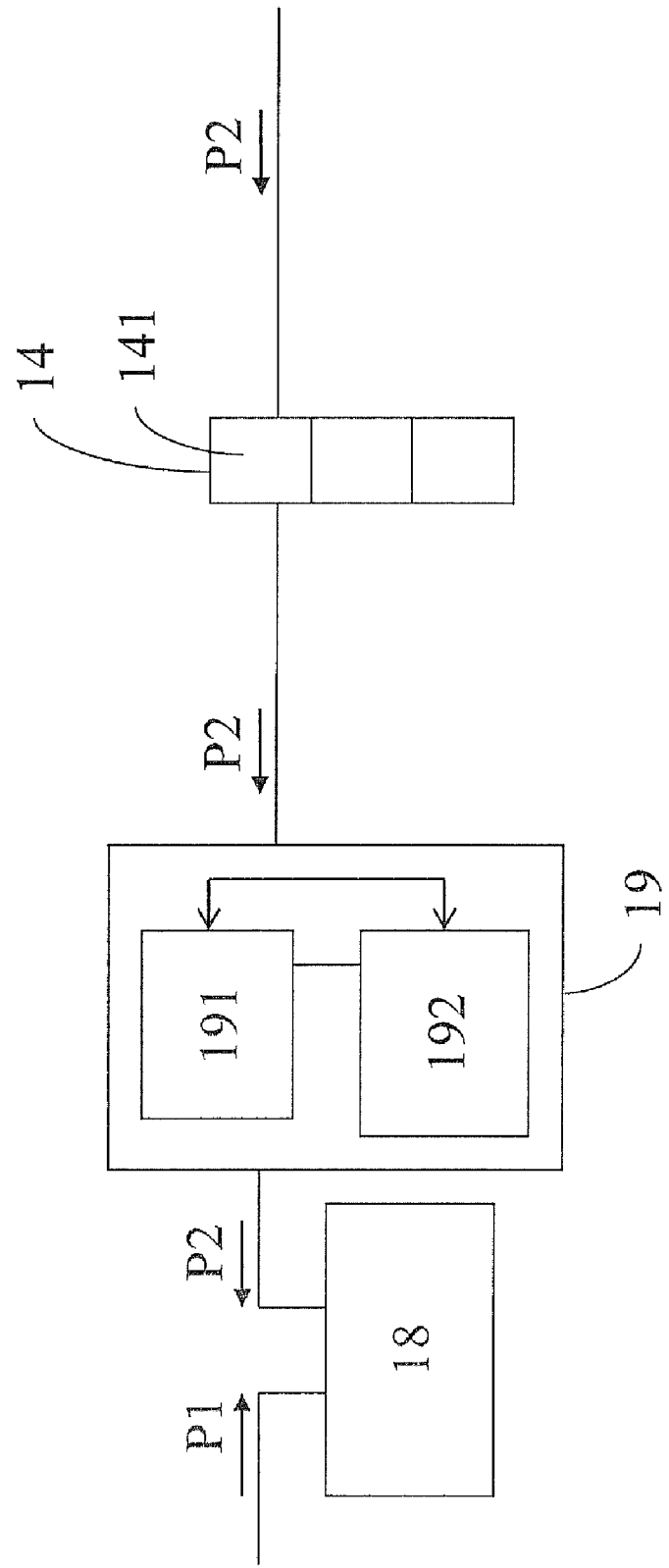
FIG. 1D is a circuit block diagram of a main body of the dual-chargeable battery pack according to a first preferred embodiment of the present invention, wherein an electrical potential modulation device is further provided.

Furthermore, seeing FIG. 1C, the electrical energy storage device 12 may further have a predetermined saturated electrical potential energy V1. When the electrical energy storage device 12 has the accumulated potential energy lower than the predetermined saturated electrical potential energy V1, the input modulation device 18 allows the first power P1 and the second power P2 to enter the electrical energy storage device 12 simultaneously. On the other hand, when the electrical energy storage device 12 has the accumulated electrical potential energy reaching the predetermined saturated electrical potential energy V1, the input modulation device 18 rejects the first power P1 and the second power P2 to enter the electrical energy storage device 12. Additionally, the input modulation device 18 further has a reverse-current prevention portion 181. When the electrical energy storage device 12 has its accumulated electrical potential higher than the electrical potential of the first power P1 or the second power P2, the reverse-current prevention portion 181 serves to prevent the accumulated electrical potential energy of the electrical energy storage device 12 from flowing reversely to the first charging terminal set 131 or the second charging terminal set 141, so as to effectively eliminate reverse current of the accumulated electrical potential energy in the electrical energy storage device 12. In addition, when there is an electrical potential difference between the first power P1 and the second power P2, the reverse-current prevention portion 181 can be activated to prevent electricity from flowing from high electrical potential to low electrical potential of either one of the first power P1 and the second power P2. Moreover, referring to FIG. 1D, the main body 11 comprises an electrical potential modulation device 19 which is located between the second charging terminal set 141 of the second connecting device 14 and the input modulation device 18. The electrical potential modulation device 19 includes an electrical potential modulation unit 191 and an input protection unit 192, for properly modulating the electrical potential of the second power P2 input from the second charging terminal set 141 of the second connecting device 14.

Figure 2A:
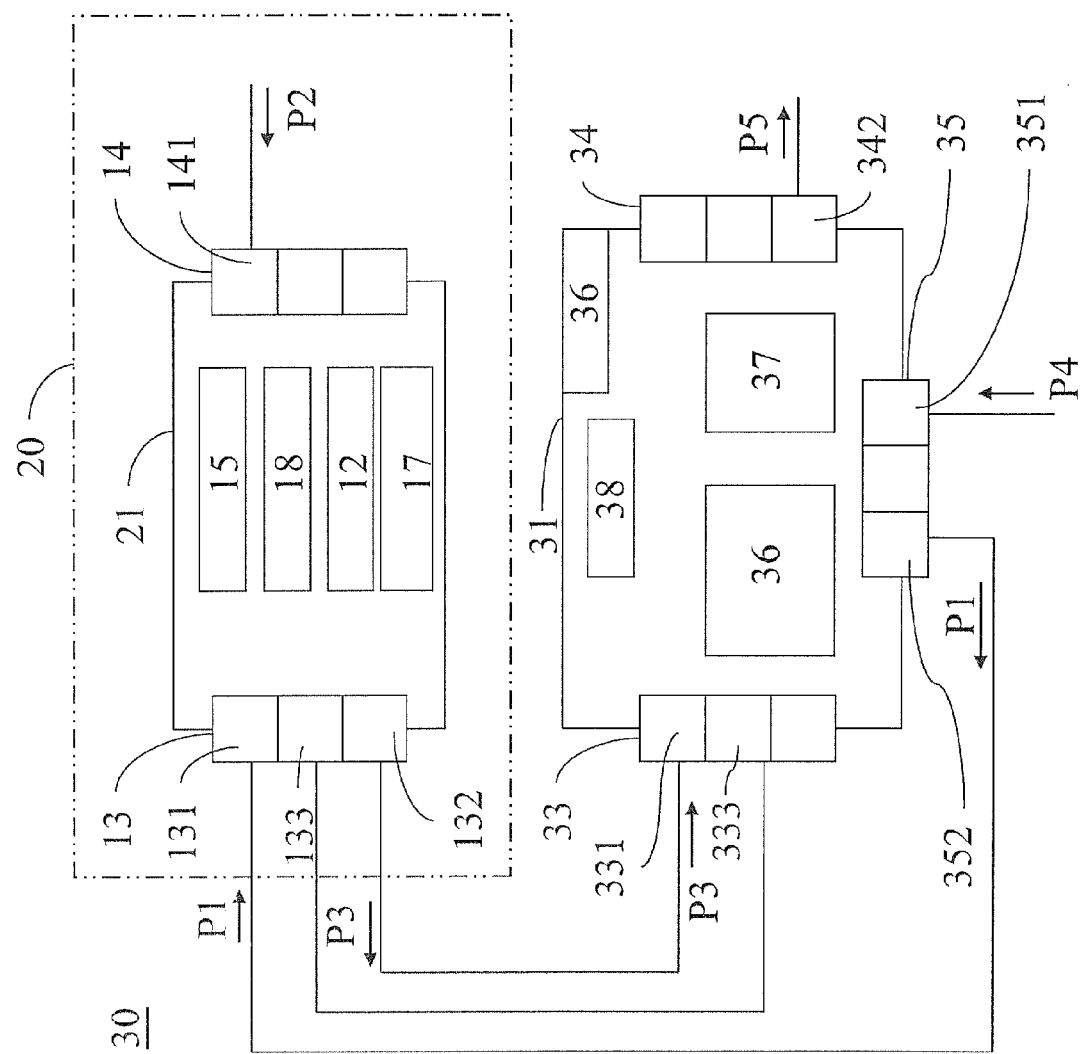
FIG. 2A is a circuit block diagram of a power supply according to a second preferred embodiment of the present invention.

Please refer to FIG. 2A for a power supply 30 according to a second preferred embodiment of the present invention. The power supply 30 primarily has a base 31 and a dual-chargeable battery pack 20. The dual-chargeable battery pack 20 primarily has a main body 21. The main body 21 includes a first connecting device 13 and a second connecting device 14. The base 31 has a third connecting device 33 and a fourth connecting device 34. By the third connecting device 33 and the first connecting device 13, the base 31 is connected to the main body 21 of the dual-chargeable battery pack 20. The first connecting device 13 and the second connecting device 14 of the main body 21 are similar to their counterparts as described in the first preferred embodiment. The main body 21 further has an electrical energy storage device 12, an AC-DC power conversion device 15, a first control unit 17 and an input modulation device 18.

Furthermore, the first connecting device 13 has a first charging terminal set 131, a first signaling terminal set 133 and a first power output terminal set 132. The first charging terminal set 131 is configured to receive an input of a first power P1 and outputs the first power P1 to the electrical energy storage device 12. The second connecting device 14 has a second charging terminal set 141, which is configured to receive an input of a second power P2, and outputs the second power P2 to the electrical energy storage device 12. Thereby, the electrical energy storage device 12 is enabled to output the electrical energy from the first power P1 and the second power P2 accumulated therein as a third power P3 through the first power output terminal set 132. The first power P1 and the second power P2 are different from each other. It should be noted that, being different from the first power P1, the second power P2 may come from a green energy source, namely from a light conversion battery, a fuel cell, a wind power generator, a swinging generator, or a vibration-based power generator. Furthermore, the dual-chargeable battery pack 20 outputs the third power P3 through the first power output terminal set 132 of the first connecting device 13.

Figure 2B:
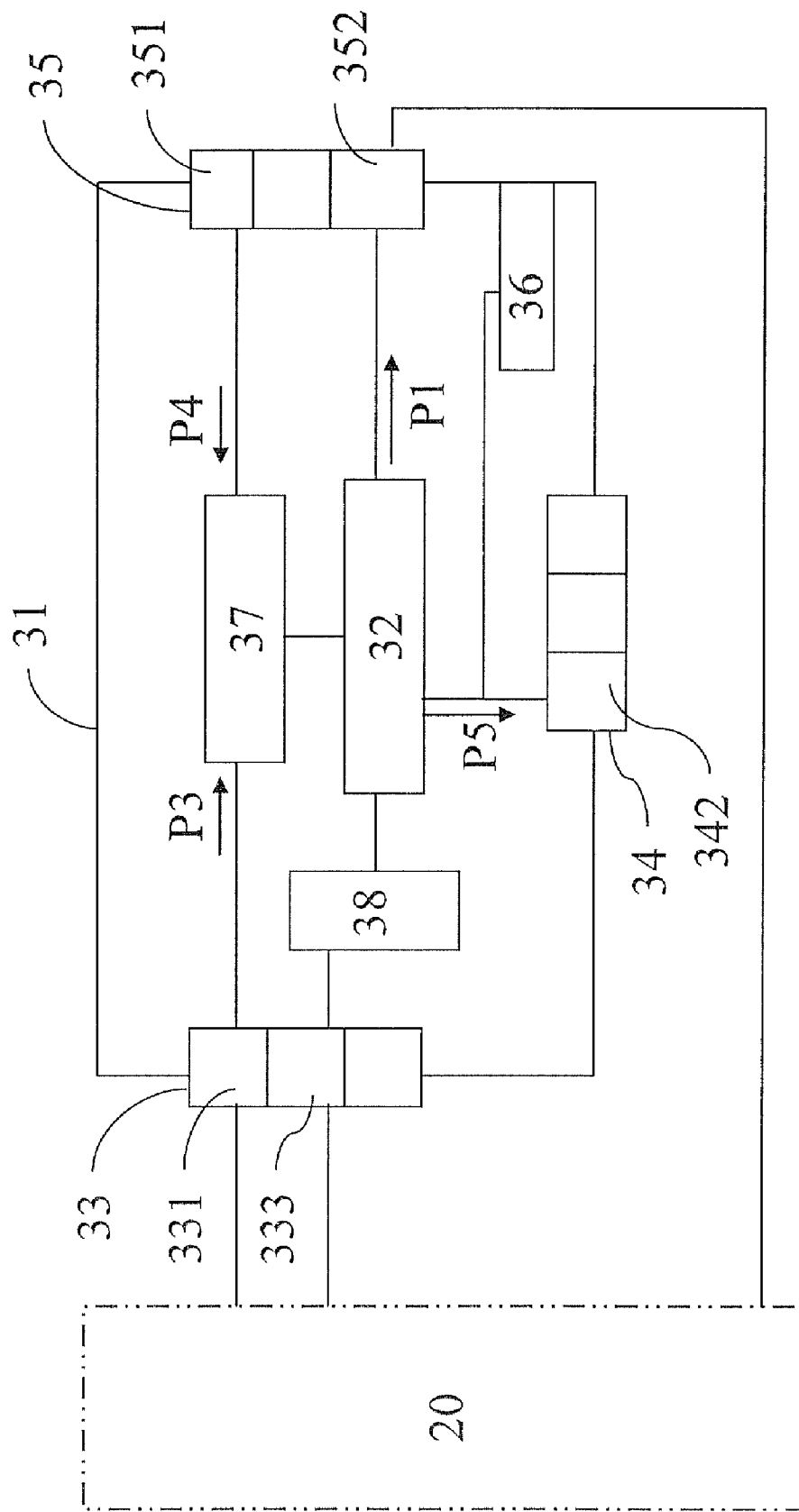
FIG. 2B is a circuit block diagram of a base of a power supply according to the second preferred embodiment of the present invention.

As can be seen in FIG. 2B, in the foregoing embodiment, the base 31 further has an output-voltage modulation device 32 for modulating the third power P3 coming from the dual-chargeable battery pack 20 into a fifth power P5 that is then output a fourth power output terminal 342 of the fourth connecting device 34 of the base 31. The output voltage of the fifth power P5 is a variable voltage, which may be 5V, 6V, 9V, 12V, 14.4V or greater than 14.4V, so as to power electronic products with different power requirements. Furthermore, the base 31 further has an indication device 36 for informing a user of the electrical potential of the modulated fifth power P5. Furthermore, the base 31 additionally has a fifth connecting device 35. The fifth connecting device 35 uses a fifth charging terminal set 351 to receive an input of a fourth power P4 (16V~19V) and the output-voltage modulation device 32 converts the fourth power P4 into the first power P1. The first power P1 is then output to the dual-chargeable battery pack 20 through the fifth power output terminal set 352 of the fifth connecting device 35. Furthermore, the base 31 has a circuit protection device 37 for properly modulating the fourth power P4 and the third power P3 so as to effectively protect the power supply 30 from damage caused by unstable power inputs.

Figure 2C:
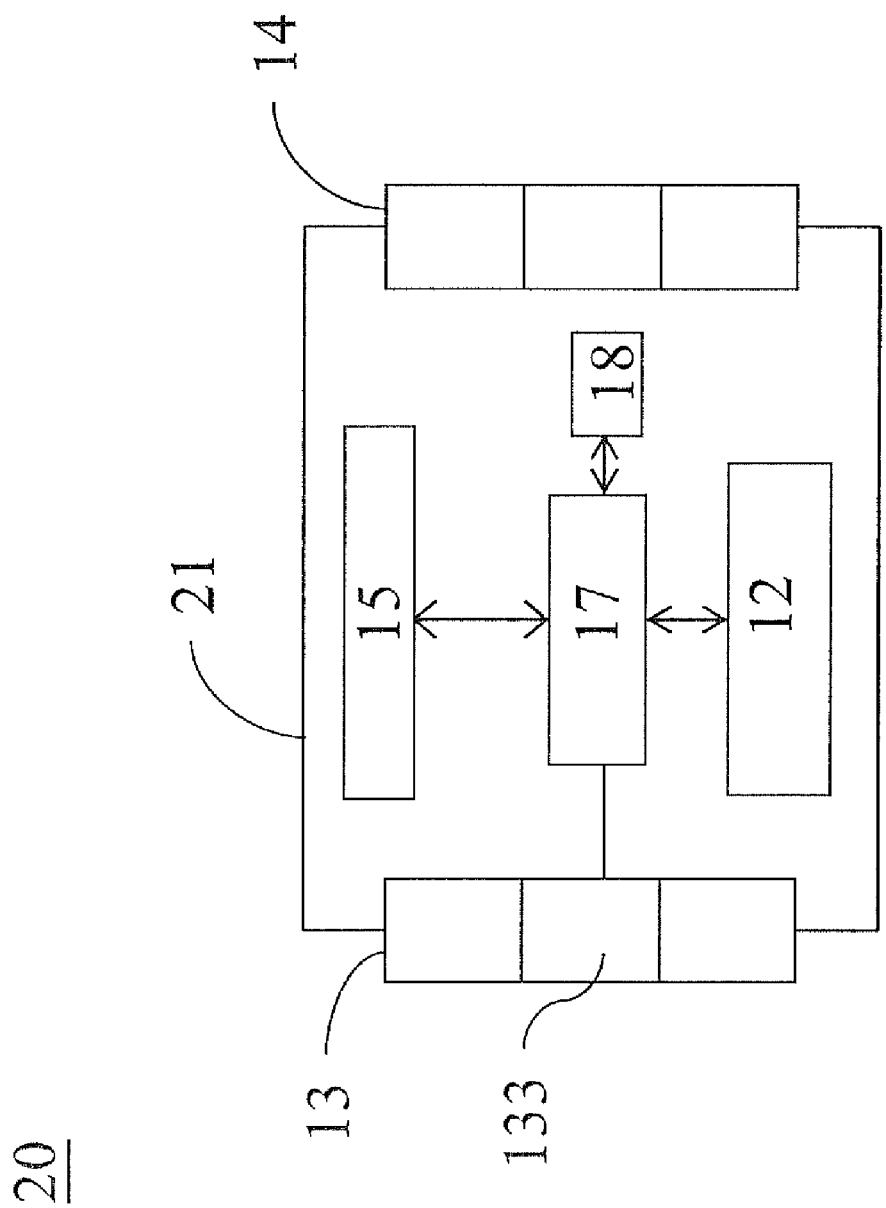
FIG. 2C is a circuit block diagram of a dual-chargeable battery pack of a power supply according to the second preferred embodiment of the present invention.

Please refer to FIGS. 2B and 2C. In the foregoing embodiment, the base 31 further has a microprocessor 38. By the connection between the third signal terminal set 333 of the third connecting device 33 and the first signaling terminal set 133 of the first connecting device 13 of the main body 21 of the dual-chargeable battery pack 20, the microprocessor 38 of the base 31 is allowed to intercommunicate with the first control unit 17 of the dual-chargeable battery pack 20, and the microprocessor 38 is also allowed to intercommunicate with the output-voltage modulation device 32. Besides, the fifth power P5 is a DC power, while both of the first power P1 and the second power P2 of the dual-chargeable battery pack 20 may be DC power or AC power, or either of them may be an AC power and a DC power, respectively.

Furthermore, referring to FIG. 2C, the first control unit 17 of the dual-chargeable battery pack 20 may be configured to intercommunicate with the electrical energy storage device 12, the AC-DC power conversion device 15 and the input modulation device 18 around it. The AC-DC power conversion device 15 is configured to convert the incoming AC power into a DC power acceptable to the electrical energy storage device 12. Furthermore, the dual-chargeable battery pack 20 uses the input modulation device 18 to modulate the power inputs and then stores the modulated power inputs in the electrical energy storage device 12. The dual-chargeable battery pack 20 has its electrical energy storage device 12, AC-DC power conversion device 15 and input modulation device 18 similar to their counterparts as described in the first preferred embodiment.

The embodiments described above are intended only to demonstrate the technical concept and features of the present invention so as to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. A power supply, comprising a base and at least one dual-chargeable battery pack, the power supply being characterized in:

the dual-chargeable battery pack comprising a main body, the main body having an electrical energy storage device, a first connecting device and a second connecting device;

the first connecting device comprising a first charging terminal set and a first power output terminal set, the first charging terminal set being configured to receive an input of a first power for outputting to the electrical energy storage device;

the second connecting device comprising a second charging terminal set configured to receive an input of a second power for outputting to the electrical energy storage device;

the electrical energy storage device being configured to output the electrical energy accumulated therein as a third power by means of the first power output terminal set while the second power is different from the first power; and the base comprising a third connecting device and a fourth connecting device, the third connecting device being configured to connect with the first connecting device and to receive the third power output by the first power output terminal set, the base further comprising an output-voltage modulation device for modulating the third power into a fifth power having a variable electrical potential, and the fifth power being output through fourth connecting device.

2. The power supply of claim 1, further comprising a fifth connecting device that is settled on the base, the power supply using the fifth connecting device to receive a fourth power, and after the output-voltage modulation device converting the fourth power into the first power, the first power being output to the dual-chargeable battery pack.

3. The power supply of claim 1, further comprising a circuit protection device, whereby properly modulating the fourth power and the third power so as to protect the power supply from damage caused by unstable power inputs.

4. The power supply of claim 1, further comprising a microprocessor intercommunicating with the dual-chargeable battery pack and the output-voltage modulation device.

5. The power supply of claim 4, wherein the main body of the dual-chargeable battery pack further comprises a first control unit for intercommunicating with the microprocessor.

6. The power supply of claim 1, wherein the fifth power is a DC power.

7. The power supply of claim 1, wherein the first power and the second power of the dual-chargeable battery pack are both DC power.

8. The power supply of claim 1, wherein at least one of the first power and the second power of the dual-chargeable battery pack is an AC power, and the dual-chargeable battery pack further comprises at least one AC-DC power conversion device for converting the AC power into a DC power.

9. The power supply of claim 1, wherein the main body of the dual-chargeable battery pack further comprises an input modulation device for modulating the input of the first power and the second power when they are output to the electrical energy storage device, the electrical energy storage device having a predetermined saturated electrical potential energy, when an electrical potential energy accumulated in the electrical energy storage device is lower than the predetermined saturated electrical potential energy, the input modulation device allows the first power and the second power to enter the electrical energy storage device simultaneously, and when the electrical potential energy accumulated in the electrical energy storage device reaches the predetermined saturated electrical potential energy, the input modulation device rejects the input of the first power and the second power to the electrical energy storage device.

10. The power supply of claim 9, wherein the input modulation device further comprises a reverse-current prevention portion, when an electrical potential accumulated in the electrical energy storage device is greater than the electrical potential of the first power or the second power, the reverse-current prevention portion prevents the electrical potential energy accumulated in the electrical energy storage device from flowing reversely to the first charging terminal set or the second charging terminal set.

11. The power supply of claim 9, wherein the input modulation device further comprises a reverse-current prevention portion, when there is an electrical potential difference between the first power and the second power, the reverse-current prevention portion prevents electricity from flowing from high electrical potential to low electrical potential of either one of the first power and the second power.

12. The power supply of claim 9, wherein the main body comprises an electrical potential modulation device located between the second charging terminal set and the input modulation device, whereby properly modulating the electrical potential of the second power.

* * * * *